(12) United States Patent
Minegishi et al.

(10) Patent No.: US 8,837,866 B2
(45) Date of Patent: Sep. 16, 2014

(54) IMAGE PROCESSING APPARATUS AND METHOD FOR CONTROLLING IMAGE PROCESSING APPARATUS

(75) Inventors: Yuka Minegishi, Kawasaki (JP); Hiroaki Nashizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 13/211,955

(22) Filed: Aug. 17, 2011

(65) Prior Publication Data
US 2012/0057808 A1 Mar. 8, 2012

(30) Foreign Application Priority Data
Aug. 20, 2010 (JP) ................................. 2010-185092

(51) Int. Cl.
*G06K 9/32* (2006.01)

(52) U.S. Cl.
USPC ........................................................ 382/298

(58) Field of Classification Search
None
See application file for complete search history.

(56) References Cited

U.S. PATENT DOCUMENTS

| | | | | |
|---|---|---|---|---|
| 5,872,867 | A * | 2/1999 | Bergen | 382/254 |
| 5,956,043 | A * | 9/1999 | Jensen | 345/582 |
| 7,922,701 | B2 | 4/2011 | Buchman | |
| 8,238,613 | B2 | 8/2012 | Boyce | |
| 2003/0043270 | A1 * | 3/2003 | Rafey et al. | 348/157 |
| 2006/0083426 | A1 * | 4/2006 | Cooper et al. | 382/181 |
| 2007/0058866 | A1 | 3/2007 | Boyce et al. | |
| 2007/0070241 | A1 | 3/2007 | Boyce | |
| 2007/0140588 | A1 * | 6/2007 | Balram et al. | 382/275 |
| 2008/0137727 | A1 * | 6/2008 | Murayama | 375/240.01 |
| 2008/0152296 | A1 * | 6/2008 | Oh et al. | 386/47 |
| 2008/0210944 | A1 * | 9/2008 | Nakamura et al. | 257/59 |
| 2009/0033683 | A1 * | 2/2009 | Schiff et al. | 345/661 |

FOREIGN PATENT DOCUMENTS

| | | |
|---|---|---|
| CN | 101072333 A | 11/2007 |
| EP | 1511320 A1 | 3/2005 |
| JP | 11-085955 A | 3/1999 |
| JP | 2005-080301 A | 3/2005 |
| JP | 2007-508788 A | 4/2007 |
| JP | 2008-011202 A | 1/2008 |
| KR | 10-2006-0132813 A | 12/2006 |
| RU | 2340944 C2 | 12/2008 |
| WO | 2006/057994 A2 | 6/2006 |
| WO | 2008/073416 A1 | 6/2008 |

* cited by examiner

*Primary Examiner* — Stephen R Koziol
*Assistant Examiner* — Delomia Gilliard
(74) *Attorney, Agent, or Firm* — Canon USA Inc. IP Division

(57) ABSTRACT

An image processing apparatus for applying film grain effects on an image of received image data includes a generating unit configured to generate, on the basis of pixel values randomly read from grain data including a plurality of pixel values, a basic grain image having a certain size larger than the grain data; a resizing unit configured to resize the basic grain image generated by the generating unit to have the same size as the received image data; and a combining unit configured to combine the basic grain image resized by the resizing unit with the received image data.

15 Claims, 10 Drawing Sheets

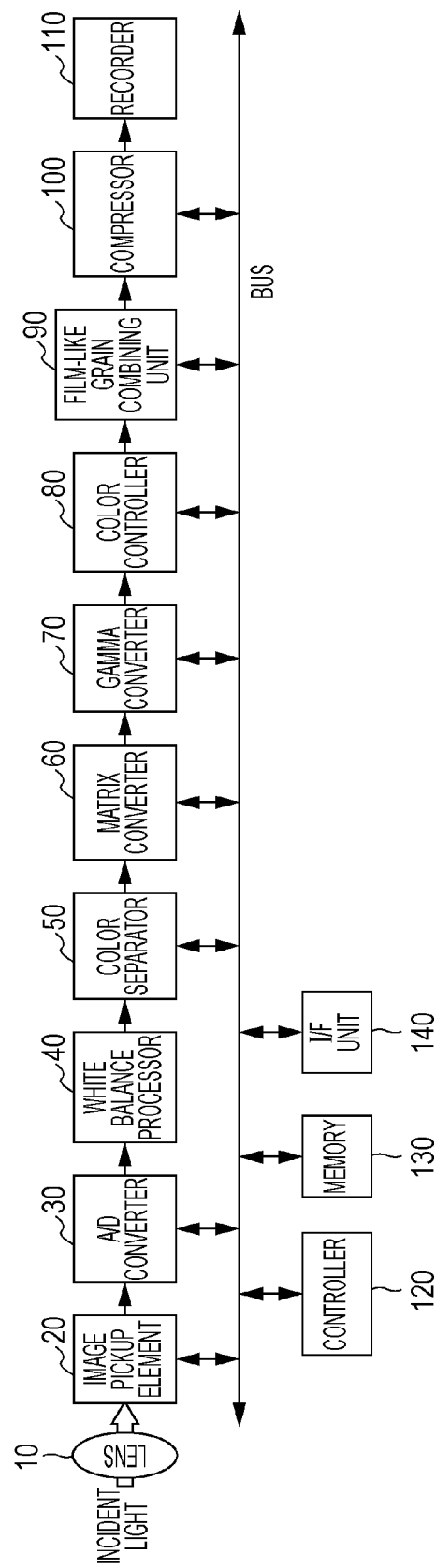

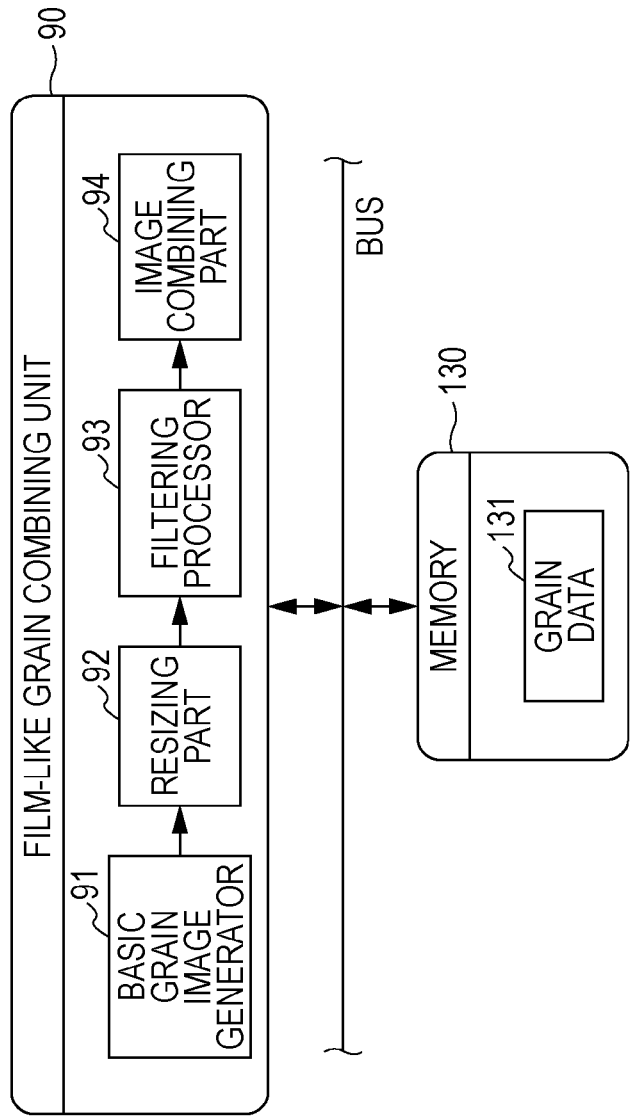

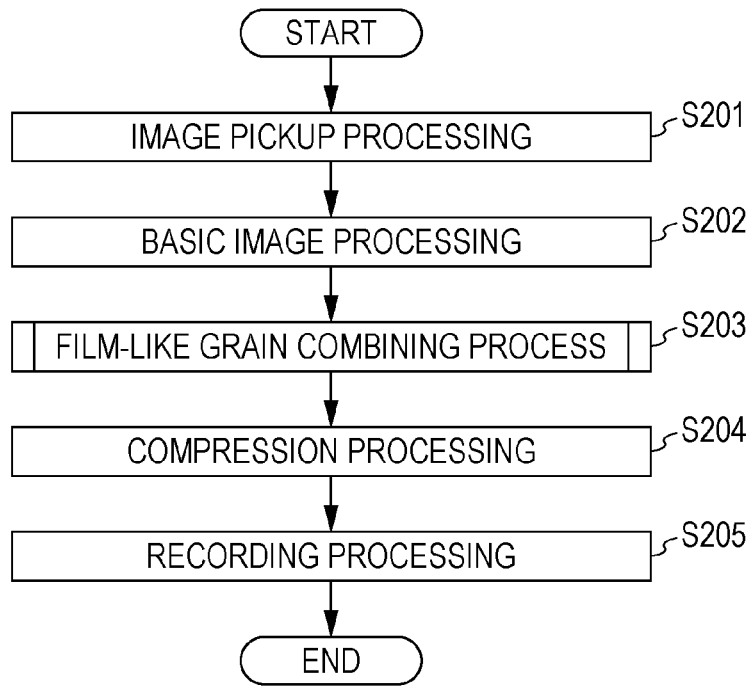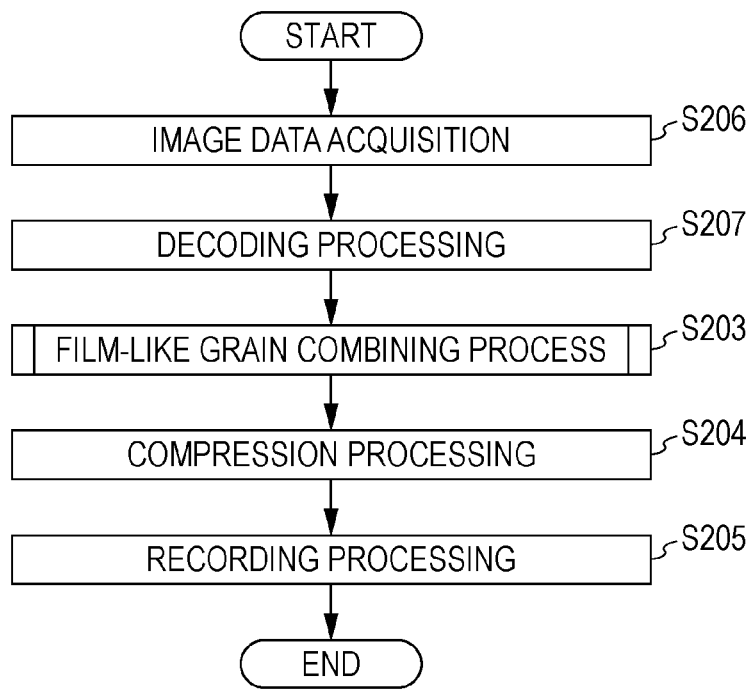

IMAGE PROCESSING APPARATUS AND METHOD FOR CONTROLLING IMAGE PROCESSING APPARATUS

BACKGROUND OF THE INVENTION

1. Field of the Invention

The present invention relates to an image processing apparatus that applies film grain-like effects in silver-salt photography to digital image data and to a method for controlling the image processing apparatus.

2. Description of the Related Art

In recent years, in order to achieve film grain effects as a way to express photographs taken using digital cameras, a method for combining noise as film grain has been suggested. In the technique described in Japanese Patent Laid-Open No. 11-085955, grain patterns are scanned and acquired from color films or false color cloud density patterns are acquired by simulation. The acquired patterns are arranged at random positions or arranged with certain distances therebetween in accordance with a desired image size. In the technique described in U.S. patent application Ser. No. 07/922,701, grain patterns having different densities and sizes are prepared in advance, and grain patterns selected in accordance with received signals are combined together and are projected to a monitor.

However, in a method like Japanese Patent Laid-Open No. 11-085955 in which grain patterns prepared in advance are arranged in accordance with an image size, it is visible that a noise pattern is attached in the size of a grain pattern prepared in advance, thus generating an unnatural image causing a viewer to feel strange. In terms of an output size of a digital camera, if grains of images in output sizes having different numbers of pixels are not set to have optimal sizes, the granularity of an image differs depending on the size of the image when being viewed. In addition, in a method like U.S. patent application Ser. No. 07/922,701 in which grain patterns having different densities and sizes are prepared in advance and grain patterns selected in accordance with received signals are combined together, it is necessary to prepare a great number of different types of grain patterns. If a great number of different types of grain patterns are not prepared in advance, a situation in which the same grain pattern frequently used in a plurality of photographing operations becomes like fixed pattern noise occurs, thus generating an unnatural image causing a viewer to feel strange, in particular, for a case of movies captured. In addition, since the memory capacity of a digital camera is limited, it is difficult to store film grain data corresponding to the entire image having a desired size.

SUMMARY OF THE INVENTION

The present invention provides an image processing apparatus and an image processing method that attain the same film granularity for a plurality of images having different sizes with only a small data amount while suppressing the generation of periodical patterns.

An image processing apparatus includes a generating unit configured to generate, on the basis of pixel values randomly read from grain data including a plurality of pixel values, a basic grain image having a certain size larger than the grain data; a resizing unit configured to resize the basic grain image generated by the generating unit; and a combining unit configured to combine the basic grain image resized by the resizing unit with received image data.

The resizing unit can resize the basic grain image to have the same size as the image data.

The generating unit can generate the basic grain image by repeatedly reading pixel values at random in units of pixels from the grain data.

The generating unit can generate the basic grain image by repeatedly reading pixel values at random in units of certain data widths from the grain data while changing a read start position.

The generating unit can generate the basic grain image by treating the grain data as image data of a two-dimensional plane image and repeatedly reading pixel values at random in units of rectangles within a plane while changing a read start position.

The generating unit can read pixel values while rotating or reversing the grain data for each reading operation.

The minimum grain unit of the grain data can be one pixel.

Pixel values of the grain data can be determined on the basis of random numbers for individual pixels.

When the basic grain image is resized, filtering processing can be performed using a certain coefficient.

The generating unit can randomly read pixel values from the grain data on the basis of a dynamic value acquired within a camera.

A method for controlling an image processing apparatus includes a generating step of generating, on the basis of pixel values randomly read from grain data including a plurality of pixel values, a basic grain image having a certain size larger than the grain data; a resizing step of resizing the basic grain image generated in the generating step; and a combining step of combining the basic grain image resized in the resizing step with received image data.

A program causes an image processing apparatus to perform the method described above.

A recording medium on which is recorded a program for causing an image processing apparatus to perform the method described above.

Further features of the present invention will become apparent from the following description of exemplary embodiments with reference to the attached drawings.

BRIEF DESCRIPTION OF THE DRAWINGS

FIGS. 1A and 1B are block diagrams illustrating an example of an image processing apparatus according to a first embodiment.

FIGS. 2A and 2B are flowcharts of a capturing process performed by the image processing apparatus according to the first embodiment.

DESCRIPTION OF THE EMBODIMENTS

First Embodiment

Figure 3:
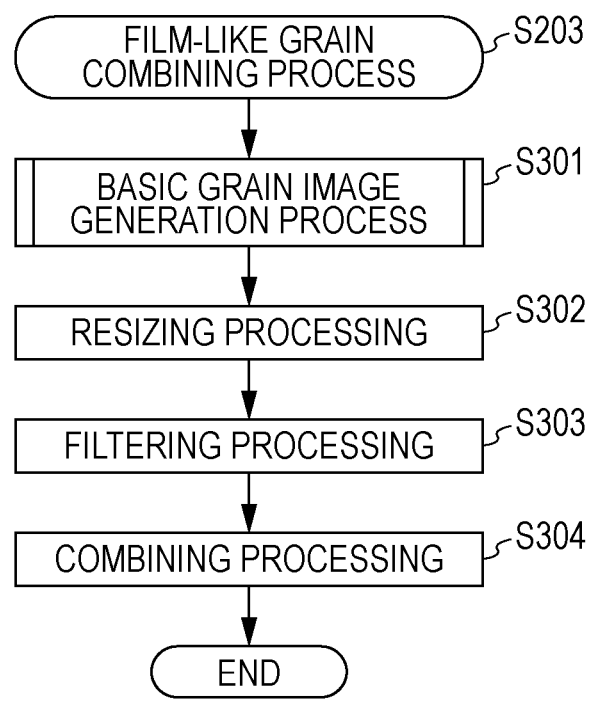
FIG. 3 is a flowchart of a film-like grain combining process according to the first embodiment.

In this embodiment, the present invention is applicable to an image processing apparatus including a capturing system such as a digital camera. However, the image processing apparatus is not limited to this. The present invention is also applicable to a personal computer (PC) which performs image processing on received image data, a printer which performs printing of an image on which image processing has been performed, and the like. That is, the present invention is applicable to any apparatus as long as the apparatus performs image processing on received image data. Image data on which image processing is to be performed is not limited to any type of image data. Image data on which image processing is to be performed is, for example, so-called RAW image data which has not been subjected to development processing, a joint picture expert groups (JPEG) image which has been subjected to development processing, or the like.

FIG. 1A is a block diagram of a digital camera as an image processing apparatus according to embodiments of the present invention.

A controller 120 issues commands to various processing units and controls the processing units to perform processing. The controller 120 performs operations in accordance with signals from an interface (I/F) unit 140 that receives external commands, such as instructions from a user, and issues commands to the various processing units.

Light beams from an object pass through an imaging optical system (lens) 10, and an image is formed on an image pickup element 20 that photo-electrically converts an object image. The image pickup element 20 is, for example, a single-plate color image pickup element including a general primary-color filter. The primary-color filter includes three types of color filters having primary transmission wavelength ranges of approximately 650 nm, approximately 550 nm, and approximately 450 nm. The color filters capture color planes corresponding to bands of red (R), green (G), and blue (B). In the single-plate color image pickup element, such color filters are spatially arranged for individual pixels, and each pixel obtains only the intensity of a corresponding color plane. Thus, a color mosaic image is output from the image pickup element. An analog-to-digital (A/D) converter 30 converts a color mosaic image output as an analog voltage from the image pickup element into digital data that is suitable for the image processing to be performed later. A white balance processor 40 performs processing for whitening white pixels in the image by well-known white balance processing. More specifically, gains for achieving color matching of R, G, and B in regions to be white are applied to R, G, and B. A color separator 50 generates, by interpolating the color mosaic image, a color image in which individual pixels have RGB color information. The generated color image is supplied to a matrix converter 60. The matrix converter 60 converts the RGB image data into YUV image data. A gamma converter 70 performs gray-scale correction on the YUV image data, and a basic color image is generated. Then, a color controller 80 performs processing for improving the appearance of the image on the generated color image. The processing performed by the color controller 80 includes image correction operations, such as noise reduction, saturation enhancement, hue correction, and edge enhancement. A film-like grain combining unit 90 performs a film-like grain combining process, which is characteristic to this embodiment, on the image output from the color controller 80. Then, a compressor 100 compresses the processed image into a format, such as a JPEG format, and a recorder 110 records the compressed image on a recording medium, such as a flash memory.

FIG. 1B is a block diagram illustrating the details of the film-like grain combining unit 90 and a memory 130. An image to which film-like grain effects have been applied is generated by generating film-like grain data having the same size as an original image and combining the generated film-like grain data with the original image. Grain data 131 in which the minimum grain unit is one pixel is stored in the memory 130 in advance. More specifically, random numbers according to Gaussian distribution are recorded as pixel values for individual pixels. Random numbers are not necessarily according to Gaussian distribution. Various types of random numbers, such as uniform random numbers and exponential random numbers, can be used. In addition, the grain data 131 may be any data, such as image data and a data sequence. A basic grain image generator 91 randomly reads the grain data 131, and expands the grain data 131 while sequentially attaching the grain data 131 temporarily up to a certain size X. Randomly reading the grain data 131 causes an effect of suppressing the generation of periodical pattern noise, unlike Japanese Patent Laid-Open No. 11-085955. A certain size X in this embodiment is, for example, the size M. The size M is an intermediate size among three sizes, L, M, and S (the size relationship of the number of pixels is L>M>S), which are set as output sizes of images for a digital camera according to this embodiment. However, the certain size X is not limited this. A reading method will be described later. An image having the size X generated as described above is referred to as a basic grain image. A resizing part 92 resizes the basic grain image to have the same size as the original image. In a case where the size of the original image is smaller than the basic grain image, that is, in a case where resizing processing is reduction processing, a filtering processor 93 performs low-pass filtering processing in order to suppress the generation of interference fringes (moire), which is generated when resizing is performed. At the same time, the filtering processor 93 performs low-pass processing in order to improve the appearance of grain of the basic grain image, irrespective of the size relationship between the original image and the basic grain image. An image combining part 94 combines the film-like grain image output from the resizing part 92 with the original image to generate a combined image to which film-like grain effects have been applied.

FIGS. 2A and 2B are flowcharts illustrating a general process from capturing to recording including a film-like grain combining process, which is characteristic to this embodiment.

FIG. 2A is a flowchart illustrating a process for performing film grain combining processing on an image captured by an image pickup element and recording the processed image in a certain compression method. Individual processing steps are performed by the controller 120 or corresponding processors in accordance with commands issued from the controller 120.

In step S201, image pickup processing is performed. In the image pickup processing, the A/D converter 30 converts a signal received from the image pickup element 20 into image data of a digital signal. In step S202, basic image processing is performed. The basic image processing includes the above-described development processing performed by the white balance processor 40, the color separator 50, the matrix converter 60, and the gamma converter 70 and image correction performed by the color controller 80. In step S203, a film-like grain combining process for applying film-like grain image effects to the image output from the color controller 80 is performed. The film-like grain combining process will be described later. In step S204, the image data output from the film-like grain combining unit 90 is compressed in a certain compression method by the compressor 100. In step S205, the compressed image data is recorded onto a recording medium by the recorder 110. In this embodiment, the film-like grain combining process is directly performed on an image acquired from the image pickup element and the processed image is recorded. However, the film-like grain combining process may be performed on so-called RAW data, which is an image acquired from an image pickup element and is temporarily recorded on a memory or a recording medium without being subjected to development processing. In this case, the RAW data can be acquired from the memory or the recording medium, and processing in step S202 and the subsequent processing in FIG. 2A can be performed on the acquired RAW data.

FIG. 2B is a flowchart illustrating a process performed in a case where the film-like grain combining process is performed on an image recorded on a memory or a recording medium in a JPEG format. In this case, in step S206, image data is acquired from the memory or the recording medium. In step S207, the acquired image data is subjected to decoding processing by a decoder, which is not illustrated. Processing similar to the processing in step S203 and the subsequent processing in FIG. 2A is performed on the image data output from the decoder.

Figure 4:
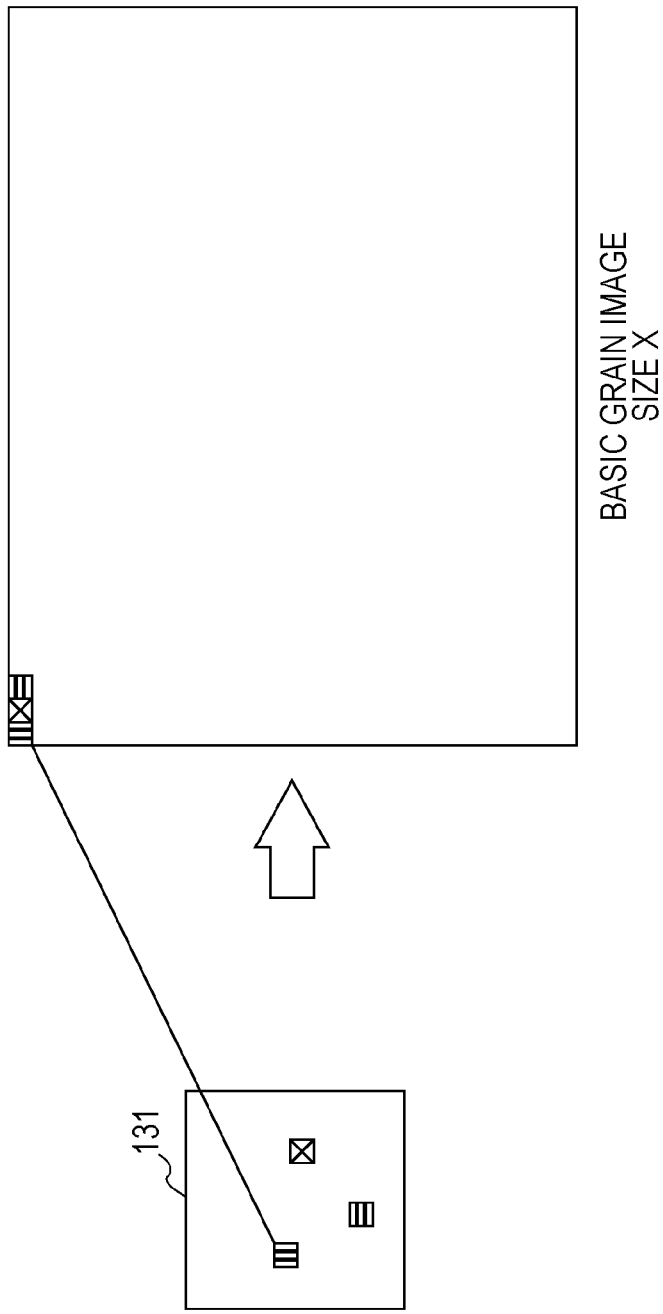
FIG. 4 is a schematic diagram illustrating a method for generating a grain data image according to the first embodiment.

The film-like grain combining process in step S203 will be explained in details with reference to a flowchart illustrated in FIG. 3 and a schematic diagram of the process illustrated in FIG. 4. Individual processing steps illustrated in FIG. 3 are performed by the controller 120 or corresponding processors in accordance with commands issued from the controller 120.

In step S301, the basic grain image generator 91 performs a basic grain image generation process for generating a basic grain image, which serves as an original of a film-like grain pattern image.

In step S302, the resizing part 92 performs resizing processing for resizing the generated basic grain image to have the same size as an original image.

In step S303, the filtering processor 93 performs low-pass processing using a certain coefficient, as described above, on the film-like grain image on which the resizing processing has been performed.

In step S304, the image combining part 94 combines the film-like grain image output from the filtering processor 93 with the original image to generate a combined image. Accordingly, the film-like grain combining process is terminated.

Figure 5:
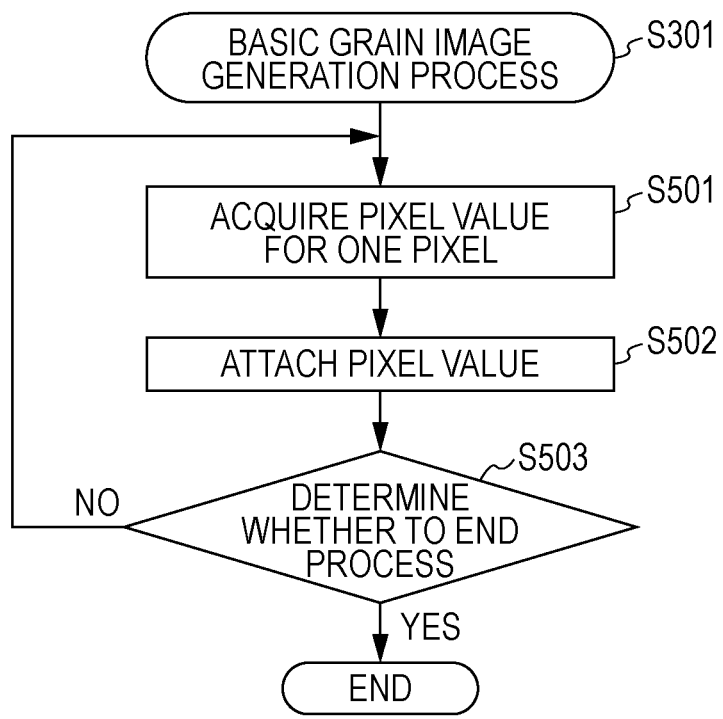
FIG. 5 is a flowchart of a basic grain image generation process according to the first embodiment.

The basic grain image generation process using the grain data 131 in this embodiment will be explained in details with reference to the schematic diagram of the process illustrated in FIG. 4 and a flowchart illustrated in FIG. 5.

In this embodiment, the grain data 131 is randomly accessed using dynamic values that can be acquired within a camera, such as processing time and orientation information and position information of the camera. More specifically, a dynamic value is used as an address. Pixel values at addresses specified by dynamic values of the grain data 131 are acquired, and the acquired pixel values are sequentially arranged as pixel values of the basic grain image having a size X. Accordingly, the basic grain image is generated.

In step S501, a read start address for one pixel of grain data is determined on the basis of processing time, and a pixel value at the determined address specified as a start position is acquired for each pixel.

In step S502, the acquired pixel value is attached, without leaving any space, to a temporary area on the memory 130 for the basic grain image having the size X. Here, the pixel value can be arranged in the vertical direction or horizontal direction.

In step S503, it is determined whether or not pixel values have been attached to the whole area for the basic grain image. If pixel values have not been attached to the whole area, the process returns to step S501 to determine a new read start address on the basis of new processing time. If it is determined in step S503 that pixel values have been attached to the whole area, the basic grain image generation process is terminated.

In this embodiment, one type of grain data used for generating a basic grain image is stored. However, the number of types of grain data to be stored is not limited. For example, by preparing in advance a plurality of pieces of grain data having different average pixel values and using some pieces of grain data while changing the proportion of read data items, a plurality of film-like grain patterns having different densities can be generated. In addition, by preparing in advance a plurality of pieces of grain data having different roughnesses and using some pieces of grain data while changing the proportion of read data items, a plurality of film-like grain patterns having different roughnesses can be generated.

As described above, in this embodiment, a film-like grain image is generated by generating a basic grain image on the basis of grain data stored in advance, resizing the generated grain image to have the same size as an original image, and combining the resized grain image with the original image. Accordingly, a combined image to which film-like grain effects have been applied is generated while suppressing the generation of periodical pattern noise. In addition, since the basic grain image that temporarily has the size X is resized to have the same size as the original image, similar granularity (size and roughness of grain) can be attained even in a case where images having different sizes are viewed at the same field angle. Furthermore, since the size of grain data is much smaller than the size of template data used in Japanese Patent Laid-Open No. 11-085955 and U.S. patent application Ser. No. 07/922,701, the amount of memory used can also be reduced.

Second Embodiment

In this embodiment, a basic grain image generation process is different from that in the first embodiment. Since the other processes are similar to those in the first embodiment, explanation of those same parts will be omitted.

Figure 6:
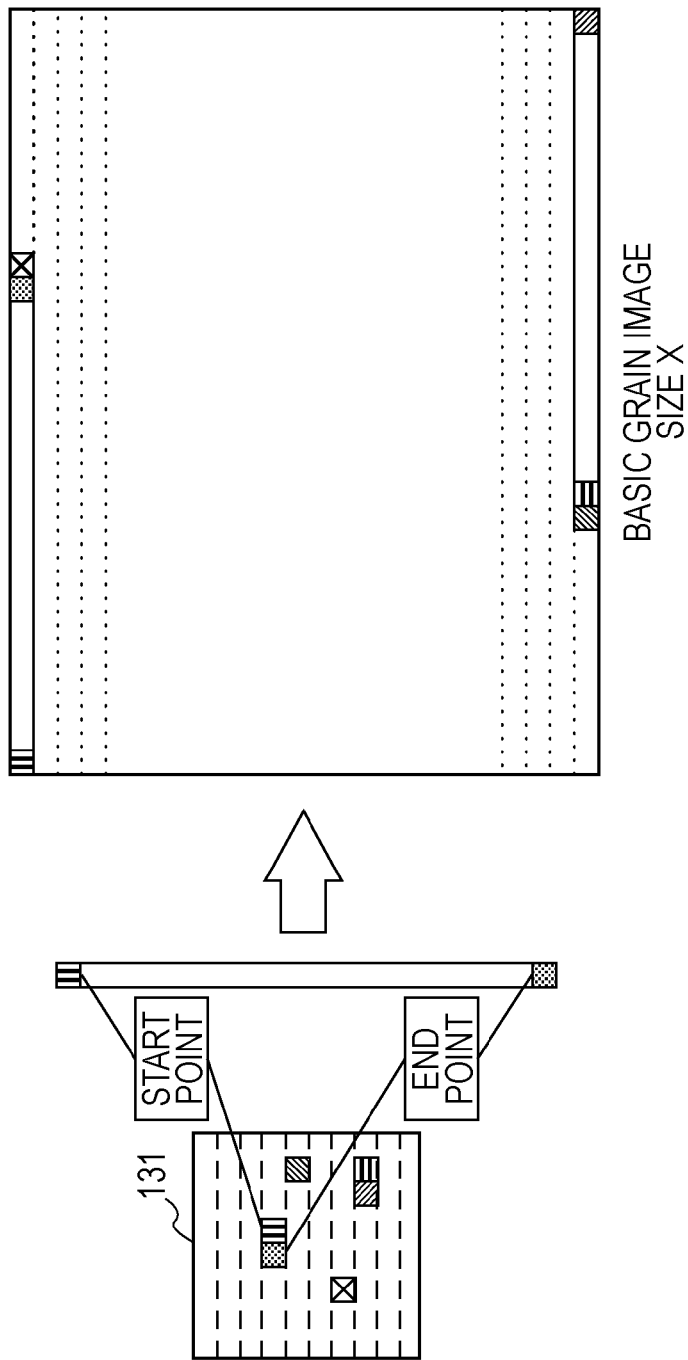
FIG. 6 is a schematic diagram illustrating a method for generating a film-like grain image according to a second embodiment.
Figure 7:
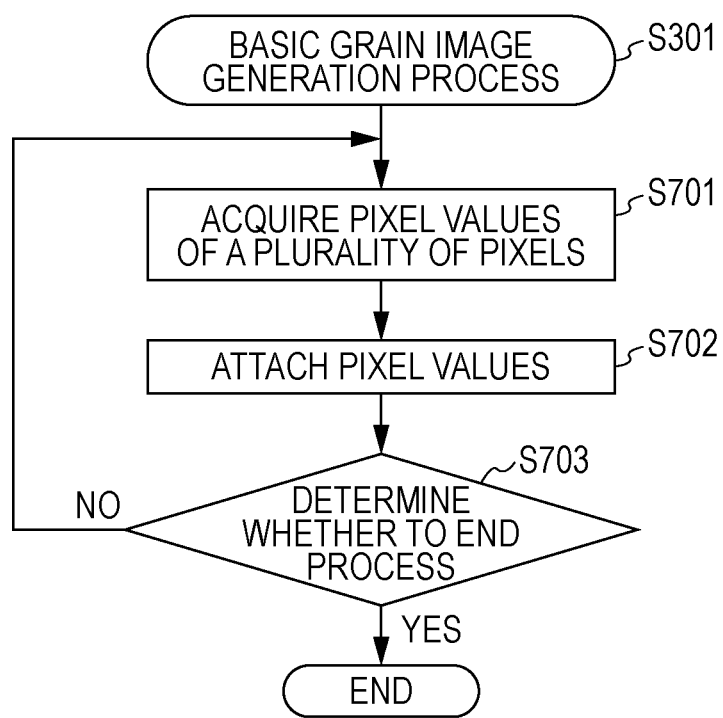
FIG. 7 is a flowchart of a basic grain image generation process according to the second embodiment.

The basic grain image generation process using the grain data 131 in this embodiment will be explained in details with reference to a schematic diagram of the process illustrated in FIG. 6 and a flowchart illustrated in FIG. 7.

Also in this embodiment, the grain data 131 is randomly accessed using dynamic values that can be acquired within a camera. However, in this embodiment, pixel data to be attached to a basic grain image is acquired by using a dynamic value as a read start address of the grain data 131 and sequentially reading data items of the grain data 131 from the read start address.

In step S701, a read start address for grain data is determined on the basis of processing time, and a data sequence, which includes pixel values of a plurality of pixels, is read as a certain data-width unit while using the read start address as a start position. In this embodiment, the first address is regarded as being subsequent to the last address, and the entire grain data 131 is read in units of data sequences, each of which extends from a read start address (start point) to a read end address (end point), which is immediately before a read start address. Here, at the time of reading a data sequence, in order to suppress the generation of periodical patterns, reading the data sequence from a read start address in the order in which the address increases and reading the data sequence in the order in which the address decreases may be performed in an alternating manner.

In step S702, the acquired pixel values are attached, without leaving any space, to a temporary area on the memory 130 for the basic grain image having the size X. Here, the pixel values can be arranged in a vertical direction or horizontal direction.

In step S703, it is determined whether or not pixel values have been attached to the whole area for the basic grain image. If pixel values have not been attached to the whole area, the process returns to step S701 to determine a new read start address on the basis of new processing time. If it is determined in step S703 that pixel values have been attached to the whole area, the basic grain image generation process is terminated.

The grain data 131 may be read after being rotated or reversed. In the present invention, a method for reading the grain data 131 is not particularly limited. In addition, the grain data 131 may be attached while being rotated or reversed. In the present invention, a method for attaching the grain data 131 is not particularly limited. Then, film-like grain data that is defined by a start point at a position specified at random and an end point at a position immediately before the start point is read, and the read film-like grain data is attached, without leaving any space, to a temporary area for a basic grain image. A plurality of data items of the film-like grain data are sequentially read at random while changing the read start point as described above, and a basic grain image having the size X can be generated.

As described above, in this embodiment, a film-like grain image is generated by generating a basic grain image on the basis of grain data stored in advance, resizing the generated grain image to have the same size as an original image, and combining the resized grain image with the original image. Accordingly, a combined image to which film-like grain effects have been applied is generated while suppressing the generation of periodical pattern noise. In addition, since the basic grain image that temporarily has the size X is resized to have the same size as the original image, similar granularity (size and roughness of grain) can be attained even in a case where images having different sizes are viewed at the same field angle. Furthermore, since the size of grain data is much smaller than the size of template data used in Japanese Patent Laid-Open No. 11-085955 and U.S. patent application Ser. No. 07/922,701, the amount of memory used can also be reduced. In this embodiment, since the number of times random values are acquired is smaller than the case in the first embodiment in which a pixel value is acquired for each pixel, dynamic values that can be acquired within a camera and that are updated (sampled) with longer intervals can also be used.

Third Embodiment

In this embodiment, a basic grain image generation process is different from that in the first embodiment. Since the other processes are similar to those in the first embodiment, explanation of those same parts will be omitted.

Figure 8:
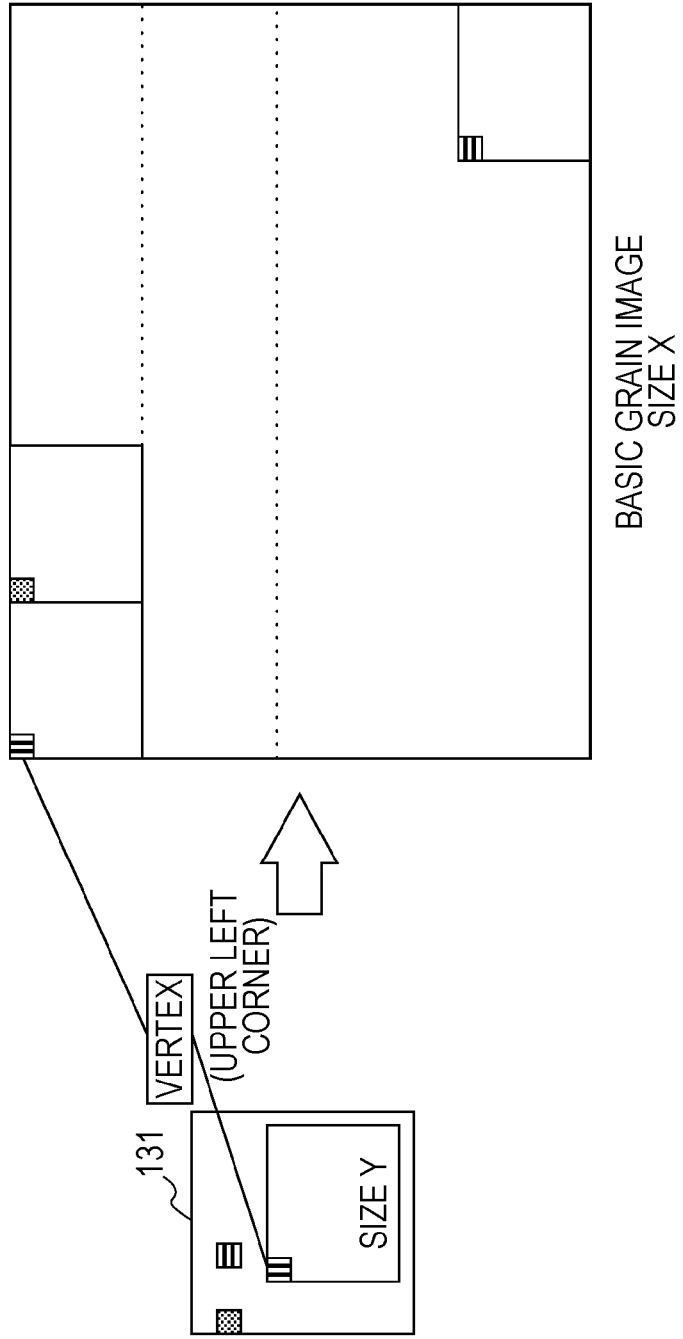
FIG. 8 is a schematic diagram illustrating a method for generating a film-like grain image according to a third embodiment.
Figure 9:
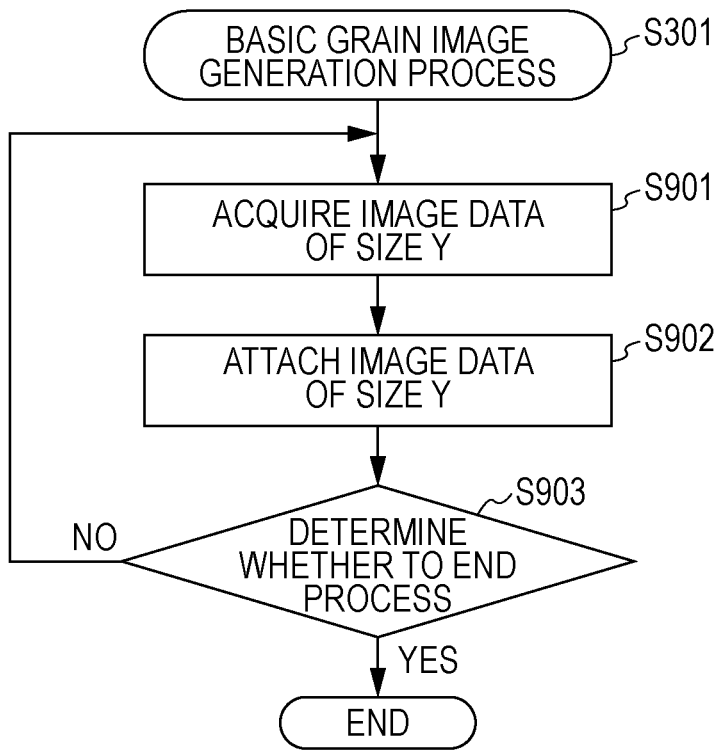
FIG. 9 is a flowchart of a basic grain image generation process according to the third embodiment.

The basic grain image generation process using the grain data 131 in this embodiment will be explained in details with reference to a schematic diagram of the process illustrated in FIG. 8 and a flowchart illustrated in FIG. 9.

Also in this embodiment, the grain data 131 is randomly accessed using dynamic values that can be acquired within a camera. However, in this embodiment, the grain data 131 is treated as image data of a two-dimensional plane image, and image data items are extracted within a plane in units of rectangles. That is, using a dynamic value as a read start address of the grain data 131, an image data item having the size Y whose upper left corner is at the read start address is extracted from the grain data 131, where the size Y is smaller than the size X.

In step S901, a read start address of grain data is determined on the basis of processing time, and an image having a size Y, which is smaller than the grain data 131 and whose upper left corner is located at the read start address is extracted. Here, the read start address is determined within a range in which an image of the size Y can be extracted from the grain data 131. In this embodiment, since the number of vertical pixels and the number of horizontal pixels of an area of the size Y are measures of the number of vertical pixels and the number of horizontal pixels of an area of size X, image data of the size Y can be attached to the area of the size X without leaving any space. However, the way of attaching image data is not limited to this. For example, an area of the size Y may be smaller than an area of the size X. In this case, image data of the size Y can be attached to the area of the size X even though the area of the size Y is not fit within the area of the size X.

In step S902, the acquired image data of the size Y is attached, without leaving any space, to a temporary area on the memory 130 for a basic grain image of the size X. Here, the image data of the size Y can be arranged in the vertical direction or horizontal direction. In order to suppress the generation of periodical patterns, the image data of the size Y can be arranged while being rotated or reversed.

In step S903, it is determined whether or not pixel values have been attached to the whole area for the basic grain image. If pixel values have not been attached to the whole area, the process returns to step S901 to determine a new read start address on the basis of new processing time. If it is determined in step S903 that pixel values have been attached to the whole area, the basic grain image generation process is terminated.

As described above, in this embodiment, a film-like grain image is generated by generating a basic grain image on the basis of grain data stored in advance, resizing the generated grain image to have the same size as an original image, and combining the resized grain image with the original image. Accordingly, a combined image to which film-like grain effects have been applied is generated while suppressing the generation of periodical pattern noise. In addition, since a basic grain image that temporarily has the size X is resized to have the same size as the original image, similar granularity (size and roughness of grain) can be attained even in a case where images having different sizes are viewed at the same field angle. Furthermore, since the size of grain data is much smaller than template data used in Japanese Patent Laid-Open No. 11-085955 and U.S. patent application Ser. No. 07/922, 701, the amount of memory used can also be reduced. In addition, in this embodiment, a read start address is always within a range in which an area of a size Y can be extracted from the grain data 131, dynamic values that can be acquired within a camera and that exhibit less dispersion as random values can also be used. Each of the embodiments described above can also be applied to image processing apparatuses, such as PCs, printers, and scanners, as described above. In this case, a PC or the like includes the film-like grain combining unit 90, the memory 130, and the like and performs the processing described above on received data. An image processing apparatus, such as a PC, may include a block that performs development processing on RAW image data so that processing on the RAW image data can be performed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-185092 filed Aug. 20, 2010, which is hereby incorporated by reference herein in its entirety.

What is claimed is:

1. An apparatus comprising:
a generating unit configured to generate, on the basis of pixel values randomly read from grain data including a plurality of pixel values, a basic grain image having a certain number of pixels larger than the grain data;
a resizing unit configured to resize the basic grain image generated by the generating unit to be a number of pixels corresponding to received image data; and
a combining unit configured to combine the basic grain image resized by the resizing unit with the received image data.

2. The image processing apparatus according to claim 1, wherein the resizing unit resizes the basic grain image to have the same number of pixels as the received image data.

3. The image processing apparatus according to claim 1, wherein the generating unit generates the basic grain image by repeatedly reading pixel values at random in units of pixels from the grain data.

4. The image processing apparatus according to claim 1, wherein the generating unit generates the basic grain image by repeatedly reading pixel values at random in units of certain data widths from the grain data while changing a read start position for each reading operation.

5. The image processing apparatus according to claim 1, wherein the generating unit generates the basic grain image by treating the grain data as image data of a two-dimensional plane image and repeatedly reading pixel values at random in units of rectangles within a plane while changing a read start position for each reading operation.

6. The image processing apparatus according to claim 1, wherein the generating unit reads pixel values while rotating or reversing the grain data for each reading operation.

7. The image processing apparatus according to claim 1, wherein the minimum grain unit of the grain data is one pixel.

8. The image processing apparatus according to claim 1, wherein pixel values of the grain data are determined on the basis of random numbers for individual pixels.

9. The image processing apparatus according to claim 1, wherein when the basic grain image is resized, filtering processing is performed using a certain coefficient.

10. The image processing apparatus according to claim 1, wherein the generating unit randomly reads pixel values from the grain data on the basis of a time value acquired within a camera.

11. A method for controlling an image processing apparatus, comprising:
a generating step of generating, on the basis of pixel values randomly read from grain data including a plurality of pixel values, a basic grain image having a certain number of pixels larger than the grain data;
a resizing step of resizing the basic grain image generated in the generating step to be a number of pixels corresponding to received image data; and
a combining step of combining the basic grain image resized in the resizing step with the received image data.

12. A non-transitory recording medium on which is recorded a program for causing an image processing apparatus to perform a method comprising:
a generating step of generating, on the basis of pixel values randomly read from grain data including a plurality of pixel values, a basic grain image having a certain number of pixels larger than the grain data;
a resizing step of resizing the basic grain image generated in the generating step to be a number of pixels corresponding to received image data; and
a combining step of combining the basic grain image resized in the resizing step with the received image data.

13. The image processing apparatus according to claim 1, wherein the resizing unit performs reduction processing.

14. The image processing apparatus according to claim 1, wherein the resizing unit performs enlargement processing.

15. The image processing apparatus according to claim 1, wherein the resizing unit performs resizing processing for received images so that similar granularity can be attained even in a case where the received images having different number of pixels are viewed at the same field angle.

* * * * *